United States Patent [19]

Toothill et al.

[11] 4,430,471
[45] Feb. 7, 1984

[54] ELASTOMERS DERIVED FROM THIODIETHANOL HAVING REDUCED ODOR

[75] Inventors: Richard B. Toothill, Warren; Ignazio S. Megna, Lebanon; Ajit K. Chaudhuri, Somerville, all of N.J.

[73] Assignee: American Cyanamid Company, Stamford, Conn.

[21] Appl. No.: 381,493

[22] Filed: May 24, 1982

Related U.S. Application Data

[63] Continuation-in-part of Ser. No. 28,017, Apr. 6, 1979, abandoned.

[51] Int. Cl.$^3$ .................. C08K 5/09; C08K 3/30; C08K 3/28; C08K 3/26; C08K 3/22; C08K 3/16
[52] U.S. Cl. .................. 524/356; 524/301; 524/356; 524/398; 524/399; 524/403; 524/419; 524/420; 524/424; 524/429; 524/431; 524/432; 524/434; 524/435
[58] Field of Search ............. 528/373; 524/301, 398, 524/399, 420, 424, 429, 431, 432, 434, 435, 403, 419, 356

[56] References Cited

U.S. PATENT DOCUMENTS

| | | | |
|---|---|---|---|
| 2,844,566 | 7/1958 | Schwarz et al. | 528/373 |
| 3,951,927 | 4/1976 | Aloia | 528/373 |
| 3,985,708 | 10/1976 | Chang et al. | 528/373 |
| 4,000,213 | 12/1976 | Chang | 525/535 |
| 4,028,305 | 6/1977 | Li et al. | 260/75 S |
| 4,094,859 | 6/1978 | Chang | 528/373 |

FOREIGN PATENT DOCUMENTS

| | | |
|---|---|---|
| 1007502 | 5/1957 | Fed. Rep. of Germany . |
| 1045641 | 12/1958 | Fed. Rep. of Germany . |
| 1108903 | 6/1961 | Fed. Rep. of Germany . |
| 2747125 | 5/1978 | Fed. Rep. of Germany . |
| 1373471 | 8/1964 | France . |
| 791854 | 3/1958 | United Kingdom . |
| 818359 | 8/1959 | United Kingdom . |

OTHER PUBLICATIONS

J. T. Abrams et al., "Thioglycol Polymers . . . ", *J. Polymer Science*, vol. XLI, pp. 225–230, (1959).
K. J. M. Andrews et al., "Thioglycol Polymers . . . ", *J. Polymer Science*, vol. XLI, pp. 231–239, (1959).
F. N. Woodward, "Thioglycol Polymers . . . ", *J. Polymer Science*, vol. XLI, pp. 219–223, (1959).

*Primary Examiner*—Veronica P. Hoke
*Attorney, Agent, or Firm*—Frank M. Van Riet

[57] ABSTRACT

The malodor in polymers based on thiodiethanol and elastomers produced therefrom is reduced by the incorporation of various metal salts of Group IB, IIB or VIII of the Periodic Table therein.

8 Claims, No Drawings

ELASTOMERS DERIVED FROM THIODIETHANOL HAVING REDUCED ODOR

CROSS REFERENCE TO RELATED APPLICATIONS

This application is a continuation-in-part of our co-pending application, Ser. No. 28,017 filed Apr. 6, 1979, now abandoned and entitled Elastomers Derived from Thiodiethanol Having Reduced Odor.

BACKGROUND OF THE INVENTION

It is very well-known that thiodiethanol, by virtue of having hydroxyl groups attached to carbon atoms situated beta to a sulfur atom in an aliphatic chain, exhibits unusual reaction activity. Unlike alkanediols, e.g., 1,4-butanediol, thiodiethanol quite readily undergoes an auto-condensation reaction under the influence of heat and certain acidic dehydration catalysts, such as hydrogen chloride. This was shown by Ballard, et al., U.S. Pat. No. 2,484,369. Low molecular weight, rubber-like materials, as indicated in the following reaction scheme, were obtained:

$$(n + 1) \, S(C_2H_4OH)_2 \xrightarrow{H+}$$

$$HO[C_2H_4SC_2H_4O]_nC_2H_4SC_2H_4OH + nH_2O$$

Woodward et al, J. Poly. Sci. 41,219–223; 225–230; and 231–239 (1959) studied the acid catalyzed auto-condensation of thiodiethanol with hydrochloric acid and phosphorus pentoxide, and the co-condensation with other aliphatic hydroxyl compounds. Hydrochloric acid catalyst provided low-molecular-weight, waxy, water-soluble polymers and ring-closed byproducts, e.g., thioxane and dithiane, while phosphorus pentoxide catalyst afforded products ranging from viscous liquids to rubbery waxes. Some indication of co-condensation with diethylene glycol, trimethylene glycol, and butylene glycols was found. However, no useful rubbery products were produced.

Thiodiethanol has also been copolymerized with equimolar amounts of 1,4-butylene glycol and/or 1,6-hexanediol, in the presence of p-toluenesulfonic acid catalyst to give waxy or low odor polymers (Holtschmidt, U.S. Pat. No. 2,998,413; Schwarz et al U.S. Pat. No. 2,844,566); with triethylene glycol, 1,6-hexanediol and trimethylolpropane in the presence of phosphorous acid catalyst to give low-molecular-weight polymers useful as polyurethane intermediates (Holtschmidt, French Pat. No. 1,373,471) and with thiodipropionic acid catalyst to give hydroxyl-terminated, low-molecular-weight polymers suitable for polyurethanes (Holtschmidt, German Pat. No. 1,045,641). These products have been reacted with aromatic diisocyanates to provide polyurethane elastomers; see, for example, U.S. Pat. No. 2,862,962; French Pat. No. 1,373,471; German Pat. Nos. 1,007,502; 1,045,641; and 1,108,903; and British Pat. Nos. 791,854 and 818,359.

Sulfur-vulcanizable elastomers, based on the condensation of thiodiethanol with one or more aliphatic diols containing a sulfur-vulcanizable double bond, are described by Aloia, U.S. Pat. No. 3,951,927; Chang et al, U.S. Pat. No. 3,985,708; Chang, U.S. Pat. No. 4,000,213; and Li et al, U.S. Pat. No. 4,028,305, all of which are hereby incorporated herein by reference.

A majority of the known elastomers of polythiodiethanol derived by an acid catalyzed condensation are, to a greater or lesser degree, malodorous. This odor, which can be quite repugnant, is believed to be attributable to the ring closed by-products, thioxane and dithiane, produced during the condensation. The degree of ring closed by-product formation can be reduced to some extent by a prudent choice of acid catalyst, phosphorous acid being one of the best in this respect. However, in any case, useful rubbery products, exhibiting outstanding physical properties, are obtained from thiodiethanol, as described in the aforementioned patents, but these products have not achieved more than limited success in the marketplace because of their characteristic malodor.

SUMMARY OF THE INVENTION

The present invention is based on the discovery that the odor characteristic of elastomers of thiodiethanol can be substantially reduced to acceptable levels, if not totally eliminated, by the incorporation therein of a salt of certain metals at one or more stages of the elastomer preparation.

DESCRIPTION OF THE INVENTION INCLUDING PREFERRED EMBODIMENTS

A. The Metal Salts

Metal salts which have been found to substantially reduce the malodor of elastomers of thiodiethanol according to the invention hereof are those capable of complexing with the odor producing components of the thiodiethanol polymers which are produced during the polymer production. Any metal salt which performs this function can be used in accordance with the instant invention. Those salts found particularly useful include the salts of metals appearing in Groups IB, IIB and VII of Mendeleeff's periodic Table of the Elements, notably copper, silver, nickel, zinc, cadmium, mercury, iron and cobalt.

The preferred metal salts are copper and zinc salts; useful anions are halides (especially chlorides), nitrates, and aliphatic carboxylic acid salts. Other salts, such as the carbonates, thiocyanates, sulfides, oxides and certain organometal compounds, such as copper acetyl acetonate and cupric ethylacetoacetate, also reduce the odor.

Although not wishing to be bound by any specific theory, it is believed that the method by which the various metal salts function to reduce malodor in polymers of thiodiethanol is through complexation with thioxane and dithiane which are believed to cause the malodor, as mentioned above. The resulting complexes have significantly reduced odor and, depending on the thermal stability of the complex formed, control the odor even during processing of the polymer at elevated temperatures. Although some of the metal salts may discolor the polymers to some extent, which may, in some instances, be undesirable from a use standpoint, the metal salts are all effective to the extent that they reduce the malodor relative to that of the untreated polymer per se. Copper and zinc salts are preferred because they are the most effective in reducing malodor and also because they produce little or no discoloration in the polymer.

Useful metal salts include, but are not limited to, the following:

Cupric chloride (bromide, iodide)

cupric acetate
cupric nitrate
cupric formate
cupric stearate
cupric carbonate
cupric octoate
cupric naphthenate
cupric acetyl acetonate
cupric ethylacetoacetate
cuprous chloride (bromide, iodide)
cuprous oxide
cuprous sulfide
cuprous thiocyanate
zinc chloride (bromide, iodide)
zinc acetate
zinc carbonate
zinc formate
zinc nitrate
zinc phosphate
zinc sulfide
cobaltic chloride (bromide, iodide)
cobaltic oxide
cobaltic sulfide
cobaltous chloride (bromide, iodide)
cobaltous acetate
cobaltous carbonate
cobaltous nitrate
cobaltous oxalate
cobaltous oxide
cobaltous sulfide
ferric chloride (bromide, iodide)
ferric acetate
ferric formate
ferric nitrate
ferric oxalate
ferric oxide
ferrous chloride (iodide, bromide)
ferrous acetate
ferrous carbonate
ferrous formate
ferrous nitrate
ferrous oxalate
ferrous oxide
nickel chloride (bromide, iodide)
nickel acetate
nickel carbonate
nickel formate
nickel nitrate
nickel oxalate
nickel oxide
nickel phosphate
silver chloride (bromide, iodide)
silver acetate
silver nitrate
silver oxalate
silver oxide
mercurous chloride (bromide, iodide)
mercurous acetate
mercurous nitrate
mercurous oxide
mercuric chloride (bromide, iodide)
mercuric acetate
mercuric carbonate
mercuric formate
mercuric nitrate
mercuric oxide
cadmium chloride (bromide, iodide)
cadmium acetate
cadmium carbonate
cadmium formate
cadmium nitrate
cadmium oxide
cadmium sulfide, and the corresponding aluminum, boron, bismuth, ruthenium,
rhodium, palladium, osmium, chromium, tin, iridium, platinum, gold etc. salts.

B. The Polymers

Thiodiethanol in major amount, i.e., at least about 50 mole percent, condenses with aliphatic saturated diols (linear, branched chain or cyclic) under the influence of heat and acidic dehydration catalysts, such as phosphorous acid, to provide low-molecular-weight, hydroxyl-terminate polyols, hereafter referred to as macroglycols. Thiodiethanol similarly homopolymerizes to form macroglycols if other diols are absent. These condensation reactions are well-known, as described in the aforementioned references. The molecular weights of these macroglycols generally range from about 500 to 4000, but may reach as high as about 8000. The condensation reaction invariably produces, at least to some degree, malodorous by-products, as discussed above. The malodor persists when the macroglycols are converted to elastomeric products. These macroglycols may be characterized by the Formula (I):

$$H\text{+}OG\text{+}_m Oh \quad (I)$$

wherein $+OG+$ comprises structural units (II) or randomly alternating structural units (II) and (III):

$$+OC_2H_4SC_2H_4+ \quad (II)$$

$$+OR+ \quad (III)$$

wherein R represents one or more radicals remaining on removal of two hydroxyl groups from saturated aliphatic linear, branched chain or cyclic diols; m is an integer sufficient to provide in the polymer a molecular weight of up to about 8000 and the molar ratio of structural units (II) to structural units (III) in the copolymers is not less than about 1:1.

The macroglycols (I) may be converted into useful elastomeric products in one of the following ways:

(1) The macroglycol may be reacted with a stoichiometric excess of a diisocyanate, preferably an aromatic diisocyanate such as tolylene diisocyanate or methylenebis (phenyl isocyanate) to provide isocyanate-terminated interpolymers, usually referred to in the art as prepolymers, having isocyanate contents ranging from about 2 to 10%. The prepolymer can then be reacted (chain-extended) with an aromatic diamine, such as methylenebis (o-chloroaniline), or a diol, such as the di-hydroxyethyl ether of hydroquinone. These reaction products are the so-called castable polyurethanes. When they are cured by heat in a mold, useful elastomeric products are obtained.

(2) The macroglycol may be reacted with one or more aliphatic diols, e.g., 1,4-butanediol, and an aromatic diisocyanate in a manner such that the ratio of isocyanate groups to the total hydroxyl groups of the macroglycol plus diol is essentially 1:1 (i.e., about 0.95; 1 to 1.05:1) to produce a thermoplastic polyurethane elastomer. Ordinarily a catalyst is used to promote the reaction, e.g., certain tin compounds. Thermoplastic elastomers may also be obtained by reacting the above mentioned isocyanate-terminated prepolymers with an aliphatic diol at essentially stoichiometric levels, optionally in the presence of a catlyst.

Sulfur-vulcanizable elastomers of thiodiethanol may be obtained in accordance with the procedures of the above-mentioned Aloia, Chang et al., Chang and Li et al patents. These elastomeric products are represented by the Formula (IV):

$$H+OP+_xOH \quad (IV)$$

wherein +OP+ comprises randomly alternating structural units selected from:

(A) structural units (II) above, and (V)

$$+OR'+ \quad (V)$$

wherein R' is one or more radicals remaining on removal of two hydroxyl groups from (a) saturated aliphatic linear, branched chain or cyclic diols, or (b) aliphatic linear, branched chain or cyclic diols containing external unsaturation and having an allylic hydrogen atom; and (B) structural units (II), above, (V), above, and (VI)

$$+OR''+ \quad (VI)$$

wherein R" is one or more radicals remaining on removal of two hydroxyl groups from a diphenolic compound. The Polymers comprising structural units (A) and (B) are characterized in that (1) x is an integer sufficient to provide in the polymer a molecular weight of at least about 8000; (2) the molar ratio of structural units (II) to structural units (V) when the polymer comprises structural units (A), or the molar ratio of structural units (II) to the total of structural units (V) and (VI), when the polymer comprises structural units (B), is not less than about 1:1; and (3) the polymers contain from 1 to 10 mole percent of diol (b), based on the total of all units (II), (V) and (VI) present in the polymer.

These polymers are millable gums containing an external, i.e., pendant, double bond which is vulcanizable, e.g. with sulfur, to give useful elastomeric products. Thus, they are compounded on conventional rubber processing equipment with vulcanizing agents, carbon black, other fillers, processing aids, etc., and cured in a mold at elevated temperatures.

As indicated, all of the polymers of thiodiethanol described herein have some degree of malodor, which is markedly reduced by the addition thereto of a metal salt, as described. The method by which the metal salt is incorporated into the polymer normally is immaterial, however, the preferred method is as follows. When preparing an isocyanate terminated prepolymer, the metal salt is added to the macroglycol, prior to reacting with the diisocyanate, as an aqueous solution. The salt is thoroughly mixed into the macroglycol, and a vacuum is then applied at a temperature over 100° C. to remove water. It is possible to add the metal salt to the ultimate prepolymer; however, since water will react with the isocyanate groups, the metal salt must be substantially anhydrous. The preferred procedure is to add the metal salt to the macroglycol.

The same procedure is used when preparing a thermoplastic polyurethane, except in this case the metal salt may be added to the macroglycol or to a mixture of the macroglycol and aliphatic diol.

Addition of the metal salt to the low-molecular-weight macroglycol is not ordinarily effective in the preparation of the millable gums. The gums are prepared by further condensation of the low-molecular-weight macroglycol under conditions of elevated temperature, vacuum and high-shear mixing in the presence of an additional catlayst, e.g., sulfuric acid. When added to the macroglycol, the metal salts may retard the condensation reaction and reduce the rate of buildup of the molecular weight. Thus, in this case, the metal salts are preferably incorporated into the gum after the desired molecular weight thereof has been attained. This may be accomplished by adding the metal salt to the gum in the high-shear mixer used in its preparation, or in a separate dough mixer, or similar type equipment such as a sigma mixer.

The amount of metal salt added to the thiodiethanol polymer will generally be dependent on the degree of malodor of the polymer and the particular metal salt used. Not all of the metal salts are equally effective in reducing malodor. In general, effective odor reducing amounts may be used with from about 0.05 to about 10.0 parts of metal salt per hundred parts of the thiodiethanol polymer being exemplary. Preferably, the amount of metal salt will range from about 0.1 to about 7.0 part, per hundred, of polymer. Mixtures of the salts at a concentration of the mixture within the above range may also be used.

The following examples are set forth by way of illustration only and are not to be construed as limitations on the present invention except as set forth in the appended claims. All parts and percentages are by weight unless otherwise specified.

EXAMPLES 1 & 2

A hydroxyl-terminated macroglycol having a molecular weight of about 2000 and prepared by the auto-condensation of thiodiethanol in the presence of phosphorous acid, is analyzed and found to contain 0.19 percent thioxane and 0.027 percent dithiane. The macroglycol is slightly malodorous. Separate portions of the macroglycol are mixed at 50°–60° C. with (1) 0.3 percent, by weight, of mercuric chloride and (2) 0.15 percent, by weight, of cuprous chloride (both as aqueous solutions). The salt solutions are thoroughly mixed into the macroglycol and the macroglycol is then dehydrated under vacuum. Malodor is markedly reduced. Analyses of the polymers gives the following results:

| Treatment | Control Blank | Example 1 0.3% HgCl$_2$ | Example 2 0.15% CuCl |
|---|---|---|---|
| % thioxane | 0.19 | 0.097 | 0.015 |
| % dithiane | 0.027 | 0.038 | 0.019 |
| odor | slight | none | none |

The data show that CuCl and HgCl$_2$ are very effective in reducing odor and that thioxane is the principal malodorous compound.

EXAMPLES 3–5

A homopolymer of thiodiethanol (0.41 mole), prepared by auto-condensation in the presence of 0.2% phosphorous acid catalyst, is mixed with 0.15 mole of thiodiethanol monomer and further condensed to give a macroglycol having a molecular weight of about 1300. The macroglycol is stirred at 90°–100° C. with 0.2% calcium oxide to neutralize the acid catalyst and 5% water for 3 hours. After removal of residual low-molecular-weight compounds, which are malodorous, by steam distillation at 180° C., the macroglycol is dried under vacuum at 100°–120° C. To separate portions of the macroglycol (which remains malodorous) is added 0.08% of each of the following metal salts (as aqueous solutions):
Example 3. Cupric chloride ($CuCl_2$)
Example 4. Nickel chloride ($NiCl_2$)
Example 5. Ferric chloride ($FeCl_3$)

Vacuum is again applied to remove the water. The resulting macroglycols exhibit a marked reduction in malodor.

The macroglycols are then reacted with methylene-bis-(phenylisocyante) at a NCO/OH ratio of about 2.43/1 to give isocyanate-terminated prepolymers having significantly reduced odor when compared to those having no metal salt therein.

EXAMPLE 6

A homopolymer of thiodiethanol is prepared in the presence of 0.2% phosphorous acid and the catalyst then neutralized with calcium oxide in the manner described in Example 3. The polymer is distinctly malodorous. To 90 ml of the viscous macroglycol is added a mixture of 0.5 of zinc chloride and 0.5 part of hydrated cupric chloride. The mixture is heated at 105° C. for 2 hours, then 4 ml of water is added at 70° C. The temperature is raised to 100° C. and a vacuum is applied to remove the water. The odor of the macroglycol is substantially improved.

EXAMPLE 7

Cuprous chloride (0.3 part) is mixed with 75 ml of the macroglycol of example 6 and heated for about 2.5 hours at 105° C. No water is added to the mixture, the cuprous chloride being only partially soluble in the macroglycol. The undissolved fraction of CuCl is filtered off. The odor of the macroglycol improved.

EXAMPLE 8

Example 7 is repeated except that 5 ml of water is added to help dissolve the salt. The mixture is dried under vacuum for about 30 minutes. The odor of the macroglycol is remarably improved. In both Examples 7 and 8, a slight discoloration is imparted to the macroglycol.

EXAMPLES 9 & 10

Following the procedure of Example 6 0.44 part of (9) cupric chloride is added to 75 ml of polythiodiethanol along with 5 ml of water. The mixture is heated at 105° C. for 1.5 hours and then dried under vacuum. The reduction in odor is greater than with cuprous chloride and there is no discoloration.

Similar results are obtained when 0.5 part of (10) cupric nitrate and 5 ml of water is added.

EXAMPLES 11 & 12

Following the procedure of Example 6, 0.3 part of (11) ferric chloride and 4 ml of water are added to the polymer. A slight yellow discoloration is imparted but odor is greatly reduced. Similar odor reduction is achieved by the addition of 0.3 part of (12) cupric acetate plus 3 ml of water.

EXAMPLES 13 & 14

Following the procedure of Example 6, one part of (13) cupric bromide in 10 ml of water is added to the polymer. The resulting polymer has a reduced odor. Similar results are obtained using one part of (14) cadmium chloride in 10 ml of water; one part of (15) silver nitrate in 8.5 ml of water; and 0.5 part of (16) copper stearate in 9 ml of benzene.

EXAMPLE 17

1,4-Butanediol (4 moles) is mixed with 0.1 percent by weight of cupric acetate monohydrate and heated at about 110° C. until the salt dissolves. Then, one mole of polythiodiethanol (mol wt 2000) is added and the mixture of diols stirred at 100° C. for about 15 minutes. To this mixture is added 5.2 moles of methylenebis (phenylisocyanate) and the mixture stirred for a short time. Stannous octoate (0.1%) catalyst is added, stirred in for about 15 seconds, and the mixture transferred to trays having a non-stick surface and cured for one hour at 120° C. The cured thermoplastic is granulated and injection molded (barrel temperature 390° F. front —400° F. center—410° F. at the die). There is no malodor evident during or after the molding operation. Polymer prepared in the absence of the cupric salt has an intolerable odor.

EXAMPLE 18

A polymer of 77% thiodiethanol—15% diethylene glycol—8% trimethylol propane monoallyl ether having a molecular weight of about 2000 and prepared at a temperature of about 190° C. in the presence of 0.25% phosphorous acid, is mixed with 0.04% sulfuric acid (as a 4M solution) and condensed at 190° C. in the presence of 0.25% phosphorous acid, is mixed with 0.04% sulfuric acid (as a 4M solution) and condensed at 190° C. and $\leq 5$ mm until the desired elastomeric gum is obtained. The gum is cooled to about 150° C. and 0.5% cuprous chloride is added (based on the weight of the polymer) as an anhydrous powder. The gum is mixed at about 150°–170° C. for about 15 minutes and then under vacuum for about 0.5 hour. When the gum is discharged from the mixer, there is very little odor detectable. Similar results are obtained using 0.9% cupric chloride. A similar gum, prepared without the metal salt treatment, is highly malodorous.

EXAMPLES 19–28

When the procedure of Example 18 is again followed except that the cuprous chloride is replaced by equivalent amounts of (19) cobaltous acetate, (20) zinc oxide, (21) nickel carbonate, (22) cupric sulfide, (23) cobalt acetyl acetonate, (24) cobalt ethyl acetoacetate, (25) silver chloride, (26) ferrous nitrate, (27) cupric oxide, and (28) zinc sulfide, a definite reduction of the malodorous nature of the gum is achieved as compared to the gum having no added salt.

We claim:

1. A composition of matter comprising an elastomer of thiodiethanol having incorporated therein an effective odor reducing amount of a halide, nitrate, carbonate, thiocyanate, sulfide, oxide, acetyl acetonate, ethylacetoacetate or carboxylic acid salt of a metal of Groups IB, IIB or VIII of Medeleeff's Periodic Table of the Elements or mixtures thereof.

2. A composition according to claim 1 wherein said metal is copper, silver, nickel, zinc, cadmium, mercury, iron or cobalt.

3. A composition according to claim 1 wherein said elastomer of thiodiethanol is represented by the formula $$H + OG +_m OH \qquad (I)$$

wherein +OG+ comprises structural units (II) or randomly alternating structural units (II) and (III):

$$+OC_2H_4SC_2H_4+ \qquad (II)$$

$$+OR+ \qquad (III)$$

wherein R represents one or more radicals remaining on removal of two hydroxyl groups from saturated aliphatic linear, branched chain or cyclic diols; said polymer being characterized in that (1) m is an integer sufficient to provide in said polymer a molecular weight of up to about 8000, and (2) the molar ratio of structural units (II) to structural units (III) is not less than about 1:1.

4. A composition according to claim 1 wherein said elastomer of thiodiethanol is represented by the formula $$H + OP +_x OH \qquad (IV)$$

wherein —OP— comprises randomly alternating structural units selected from:
(A) structural units (II) and (V)

$$+OC_2H_4SC_2H_4+ \qquad (II)$$

$$+OR'+ \qquad (V)$$

wherein R' is one or more radicals remaining on removal of two hydroxyl groups from:
(a) saturated aliphatic linear, branched chain or cyclic diols, or
(b) aliphatic linear, branched chain or cyclic diols containing external unsaturation and having an allylic hydrogen atom; and
(B) structural units (II), (V), and (VI)

$$+OR''+ \qquad (VI)$$

wherein R'' is one or more radicals remaining on removal of two hydroxyl groups from a diphenolic compound; said polymers comprising structural units (A) and (B) being characterized in that (1) x is an integer sufficient to provide in said polymer an average molecular weight of at least about 8000; (2) the molar ratio of structural units (II) to structural units (V), when the polymer comprises structural units (A), or the molar ratio of structural units (II) to the total of structural units (V) and (VI), when the polymer comprises structural units (B), is not less than about 1:1; and (3) the polymers contain from 1 to 10 mole percent of said diol (b), based on the total of all units (II), (V), and (VI) present in said polymer.

5. A method which comprises reducing the malodor in elastomers of thiodiethanol which possess malodor by incorporating therein an effective odor reducing amount of a halide, nitrate, carbonate, thiocyanate, sulfide, oxide, acetyl acetonate, ethylacetoacetate or carboxylic acid salt of a metal of Groups IB, IIB or VIII of Mendeleeff's Periodic Table of the Elements or mixtures thereof.

6. A method according to claim 5 wherein said metal is copper, silver, nickel, zinc, cadmium, mercury, iron or cobalt.

7. A method according to claim 5 wherein said elastomer of thiodiethanol is represented by the formula $$H + OG +_m OH \qquad (I)$$

wherein +OG+ comprises structural units (II) or randomly alternating structural units (II) and (III):

$$+OC_2H_4SC_2H_4+TM \qquad (II)$$

$$+OR+ \qquad (III)$$

wherein R represents one or more radicals remaining on removal to two hydroxyl groups from saturated aliphatic linear, branched chain or cyclic diols; said polymer being characterized in that (1) m is an integer sufficient to provide in said polymer a molecular weight of up to about 8000, and (2) the molar ratio of structural units (III) to structural units (III) is not less than about 1:1.

8. A method according to claim 5 wherein said elastomer of thiodiethanol is represented by the formula $$H + OP +_x OH \qquad (IV)$$

wherein +OP+ comprises randomly alternating structural units selected from:
(A) structural units (II) and (V)

$$+OC_2H_4SC_2H_4+ \qquad (II)$$

$$+OR'+ \qquad (V)$$

wherein R' is one or more radicals remaining on removal of two hydroxyl groups from:
(a) saturated aliphatic linear, branched chain or cyclic diols, or
(b) aliphatic linear, branched chain or cyclic diols containing external unsaturation and having an allylic hydrogen atom; and
(B) structural units (II), (V), and (VI)

$$+OR''+ \qquad (VI)$$

wherein R'' is one or more radicals remaining on removal of two hydroxyl groups from a diphenolic compound; said polymers comprising structural units (A) and (B) being characterized in that (1) x is an integer sufficient to provide in said polymer an average molecular weight of at least about 8000; (2) the molar ratio of structural units (II) to structural units (V), when the polymer comprises structural units (A), or the molar ratio of structural units (II) to the total of structural units (V) and (VI), when the polymer comprises structural units (B), is not less than about 1:1; and (3) the polymers contain from 1 to 10 mole percent of said diol (b), based on the total of all units (II), (V), and (VI) present in said polymer.

* * * * *